Dec. 27, 1955         P. L. DE BOURGKNECHT         2,728,862
RADIATION MEASURING INSTRUMENT
Filed Feb. 13, 1953                                2 Sheets-Sheet 1

INVENTOR
PIERRE L. de BOURGKNECHT
BY
ATTORNEY

Dec. 27, 1955  P. L. DE BOURGKNECHT  2,728,862
RADIATION MEASURING INSTRUMENT
Filed Feb. 13, 1953  2 Sheets-Sheet 2

INVENTOR
PIERRE L. de BOURGKNECHT

BY
Spencer E. Olson
ATTORNEY

United States Patent Office 2,728,862
Patented Dec. 27, 1955

2,728,862

RADIATION MEASURING INSTRUMENT

Pierre L. de Bourgknecht, Boston, Mass., assignor to Tracerlab, Inc., Boston, Mass., a corporation of Massachusetts Application February 13, 1953, Serial No. 336,728

12 Claims. (Cl. 250—83.6)

This invention relates to detection of radiations such as emanate from radioactive materials. More particularly it is concerned with a new and improved measuring device for use in detecting a very wide range of radiation intensities on a single instrument, without the need for scale changers and the like, and in which the instrument response is a non-linear and preferably logarithmic function of the change in radiation intensity to which the device is subjected.

In the usual radiation detector, whether it be of the ion chamber or photo-tube type, the operation depends upon measuring the electric current flowing in a chamber or a photo-tube as a result of the irradiation. In most ion chambers or phototubes this output current is a linear function of the intensity of incident radiation.

For example, in an ion chamber type of instrument, there is usually provided a sensitive volume defined by a pair of electrodes across which is impressed a difference of electrical potential. The chamber is filled with an ionizable medium, usually an inert gas, and upon irradiation electrons will be knocked free from the atoms of the gaseous medium leaving the atoms or molecules as positively charged ions. With no charge on the electrodes the positive ions and free electrons will move about at random until they recombine to form stable neutral atoms again and no ionization current will be developed. However, with the impression of a voltage on the electrodes a collecting electric field is established within the chamber, causing the positive ions to migrate to the negatively charged electrode where their charges may be neutralized. As the value of the voltage impressed is increased, the recombination effects noted above become progressively less until a sufficiently strong field is established to discourage recombination entirely. At this point the ions are swept out of the field immediately upon formation and the ionization current developed is said to have reached a saturation value which is independent of additional voltage increments applied to the electrodes over a wide range. It is in this characteristic saturated region, yielding a so-called saturation current, that most ion chamber radiation measuring devices are usually operated, for in this region the magnitude of the chamber current or response then depends almost entirely upon the intensity of the ionizing radiations to which the chamber is subjected, and such response will be virtually linear.

Likewise, phototube and photomultiplier tube detectors, which depend upon the fluorescing of a phosphor subjected to radiations, the phosphor being so positioned with respect to the tube that the scintillations thereof when irradiated will activate the tube, also yield a linear response.

It is evident that if a radiation measuring device employing one of the above described detectors were designed for operation over an intensity range of say one milliroentgen per hour (1 mr./hr.) through one million milliroentgens per hour (1,000,000 mr./hr.), the detecting element would give a current output which would vary by a factor of a million to one, since the response would be linear. Consequently, in order to provide reasonable reading accuracy, the output meter would have to be equipped with a scale changer, dividing the operating range into, for example, six separate ranges.

An example of a function transformer to be used in connection with a saturated ionization chamber, or other device delivering a current of the order of $10^{-8}$ to $10^{-14}$ amperes to be measured on a logarithmic scale, is the so-called logarithmic diode which is described in copending application Serial No. 198,785, filed December 2, 1950, now U. S. Patent 2,676,268 and assigned to the assignee of the present application. This circuit comprises the combination of a saturated ionization chamber, a diode-type vacuum tube connected in series with the detector, and an electrometer circuit for measuring the voltage drop across the diode. In this arrangement, the plate of the diode is operated at a negative voltage with respect to the cathode, which is heated at rated temperature. The current from the ionization chamber flows through the diode and the voltage across the diode is related to the current by the formula:

$$V = \frac{kT}{e} \ln \frac{I}{I_0}$$

in which $V=$ the voltage drop across the diode
$k=$ Boltzmann's constant
$T=$ diode filament temperature in degrees Kelvin
$e=-$ the charge of the electron
$I=$ the current through the diode, and
$I_0=$ the current when $V=0$.

This circuit is relatively simple to construct, has relatively low power requirements, and is operable over several decades of radiation intensity, but it inherently has a number of limitations on stability and ease of manufacture. For example, for the foregoing logarithmic function to be realized, the electrodes of the diodes are preferably planar, a factor which seriously limits the choice of tubes which may be used in the circuit. Further, the filament temperature and emissivity characteristics of the diode are very critical and small changes in the filament heater voltage arising through decay of the battery with use seriously affect the operation of the system. Moreover, since the control action of the diode results wholly from the movement of electrons within the space between the filament and the anode, it is difficult, if not impossible, independently to adjust the slope and working point of the diode operating characteristics.

In accordance with the present invention, I have discovered that the foregoing difficulties of the logarithmic diode circuit can be overcome by the new and improved radiation measuring instrument hereinafter described in which the output bears a substantially logarithmic relation to the intensity of the incident radiation.

It is accordingly an object of the present invention to provide an improved device of the type described which may be employed in measuring with accuracy radiations varying widely in intensity without the need for scale changers or the like.

It is a further object of the present invention to provide a new and improved radiation measuring device whose response bears a logarithmic relation to the incident radiation, and which is not limited in the choice of tube type and is more stable over wide ranges than circuits heretofore available.

It is a further object of the present invention to provide a radiation measuring instrument having a logarithmic response in which the logarithmic characteristic is not affected by changes in battery voltage with current drain.

A still further object of the present invention is to provide an instrument having a logarithmic response for measuring minute currents in which the logarithmatizing element may be operated well below rated filament voltage and current whereby its useful life is considerably extended.

With the foregoing and other objects in view, the invention is featured by the provision, in combination, of a radiation detector whose output current varies as a linear function of the intensity of incident radiation, a diode-type vacuum tube connected in series with the detector and operated in the region where Richardson's equation approaches a true exponential function, a direct current amplifier for measuring the voltage drop across the diode, and an information feedback loop from the output of the amplifier to the filament of the diode for thermionically controlling the effective dynamic resistance of the diode. In other words, the diode is so connected and operated that it functions as a thermionically controlled load resistor having a logarithmic characteristic.

Further objects and features of the invention will become apparent from the following detailed description of preferred embodiments thereof, taken in connection with the accompanying drawings, in which like numerals refer to like parts in the several figures, and in which.

Figure 1:
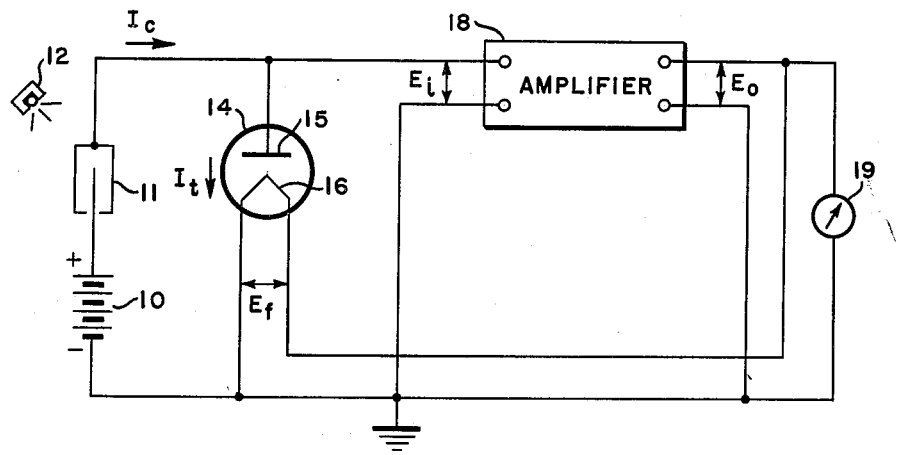
Fig. 1 is a circuit diagram, partially in block diagram form, of an ionization chamber type of radiation measuring device in accordance with the invention.

Referring now to Fig. 1, the circuit of the present invention comprises battery 10, the negative terminal of which is grounded and the positive terminal of which is connected to one electrode of ionization chamber 11. The current $I_c$ drawn by the battery is controlled by ionization chamber 11 proportionally to the incident radiation from a source diagrammatically illustrated at 12. A diode type electron tube 14 is connected in series with the ionization chamber with its anode 15 connected to the other terminal of ionization chamber 11 and with one of the terminals of its filament 16 connected to ground, as shown. The anode 15 of diode 14 is always maintained by the flow of the current $I_c$ at some positive voltage $E_D$ with respect to filament 16, said voltage $E_D$ being preferably above the saturation voltage for the specific working conditions of tube 14. The voltage developed across diode 14 is coupled to direct current amplifier 18 designed in such a way that its total gain, including the utilization loop, is essentially constant over a predetermined range. The output terminals of amplifier 18 are connected to the filament leads of diode 14 and provide for the feedback of an information signal in a manner which will be more completely described hereinafter. A meter 19 is connected across the output terminals of amplifier 18 for indicating the magnitude of the heating power fed back to the filament of diode 14.

Having outlined the basic components of the system, the basis on which the circuit functions to provide a logarithmic response will now be presented. The battery 10, saturated ionization chamber 11 and diode 14 being connected in series, and the amplifier 18 having a high input impedance, the current $I_c$ produced by incident radiation from source 12 necessarily flows through diode 14. Thus a first condition of the circuit is that $$I_c = I_t \quad (1)$$

where $I_t$ is the current through diode 14. The current in diode 14 is a function of the voltage $E_f$ applied on the filament, and to a certain extent, of the voltage $E_D$ developed across the diode by the flow of $I_c$. Furthermore, the output voltage $E_o$ of amplifier 18, is by definition, a linear function of the voltage $E_i$ applied at the input of the amplifier. Now, by virtue of the connection of amplifier 18 across diode 14, and the feedback connection to the filament of diode 14, the following relations can be written:

$$E_o = E_f \quad (2)$$
$$E_D = E_i \quad (3)$$
$$E_o = GE_i \quad (4)$$

where G is the amplification of amplifier 18. Thus the system is fully depicted by the equation, $$I_c = I_t = f(E_o = E_f, E_D = E_i) \quad (5)$$

or by virtue of Equations 1, 2, 3 and 4

$$I_c = f_1(E_o) \quad (6)$$

Accordingly, for the system to provide a logarithmic indication, it is necessary that the current, $I_t$ bear a logarithmic relation to $E_o$ or $E_i$. This relationship is present in Richardson's equation, which states that the current emitted by a filament is related to the filament temperature as follows:

$$I_e = SAT^2 e^{-b/T} \quad (7)$$

where $I_e$ = current emitted by the filament
$S$ = area of the filament
$A$ and $b$ can be considered constant, and
$T$ = temperature of the filament in degrees Kelvin.

With commercially available tubes, within the range of values of T corresponding to the order of magnitude of the current encountered in an ionization chamber, the $SAT^2$ portion of Equation 7 can be regarded as being substantially constant when compared to the $e^{-b/T}$ portion of the same equation, and accordingly, Equation 7 can be approximated as follows:

$$I_e = K e^{k_1 E_f} \quad (8)$$

wherein K and $k_1$ can be considered constant, and $E_f$ is the voltage applied to the filament of the diode, the term $-b/T$ of Equation 7 being regarded as proportional to the voltage applied to the filament of the diode.

Now, as defined before, $I_e$ of Equation 8 is the current emitted by the filament of diode 14. The quantity of interest, however, is the current $I_t$, collected by anode 15, these quantities being related by the equation $$I_t = f_2(I_e) \quad (9)$$

where $f_2$ is some function of $E_D$, the voltage across the tube. It can be shown both experimentally and mathematically that the function $f_2$, which is dependent on Shottky effects, can be represented in a first region, called the space charge region, by an equation of the form $$I_t = K_2 e^{3/2} \quad (10)$$

where $K_2$ is a constant, and in a second region, by approximation above the so-called saturation level, by a linear function. If diode 14 is operated in this second region, Equation 8 can be replaced by $$I_t = FK e^{k_1 E_f} \quad (11)$$

where F is a slowly varying function of $E_f$ and $E_D$. Thus, successive increments in radiation intensity related by the factors $\alpha$, $\alpha^2$, $\alpha^3$, ... etc. produce increments in the magnitude of $E_o$ related by the factors $E_o\beta$, $2E_o\beta$, $3E_o\beta$, ... etc. Thus, the overall system provides a logarithmic response.

A number of approximations have been made in the foregoing analysis, but they do not appreciably affect the operation of the system if certain conditions are present. First, the voltage of battery 10 minus the voltage $E_D$ developed across diode 14 should never reach the limit of the minimum saturation voltage for ionization chamber 11. In other words, it is necessary to limit the voltage developed across diode 14 to a value which will always insure that chamber 11 is operating in the saturated region. Secondly, it is necessary that the gain of amplifier 18 be substantially constant over a predetermined range, and that the output impedance of the amplifier be small compared with the resistance of the filament of diode 14 throughout the range of temperatures of the filament corresponding to the extreme limits of ionization currents to be measured. Further, the approximate equation, $I_e = K e^{k_1 E_f}$ (8) must be reasonably legitimate in the same range of temperatures. Finally, the function F of Equation 11 must be a slowly varying function of the filament voltage $E_f$. It can be shown by rigorous mathematical treatment that the foregoing conditions are realizable with commercially available components, and it has been determined experimentally that currents of the order of $10^{-8}$ to $10^{-14}$ amperes can be indicated logarithmically by the present system.

Referring again to Fig. 1, when the instrument is subjected to a source of radiation 12, the filament of diode is heated to a temperature $T_1$ in response to a voltage $E_{f_1}$ applied thereto, such that the number of electrons $N_1$ released from filament 16 corresponds to the current $I_{c_1}$ yielded by ionization chamber 11. With this flow of current, a positive voltage $E_{D_1}$ appears at the anode of diode 14 which is of such a magnitude that all of the electrons emitted by the filament are collected by the anode. Thus, a current $I_{c_1}$ flows in the loop including battery 10, ionization chamber 11 and diode 14, the voltage $E_{D_1}$ being determined essentially by the current-voltage characteristics of diode 14 corresponding to a filament heating voltage $E_{f_1}$. Now, if the gain of amplifier 18 is so adjusted that $E_{o_1} = E_{f_1}$ when the input voltage to the amplifier $E_{i_1} = E_{D_1}$, the system is in equilibrium and meter 19 indicates that $E_{o_1}$ volts are applied to the filament of diode 14.

If the instrument is now exposed to a second radiation field of greater intensity, the current $I_{c_1}$ tends to increase to a new value $I_{c_2}$ in accordance with the linear characteristics of saturated ionization chamber 11. Because diode 14 is temperature limited, however, by the filament heating voltage $E_{f_1}$, it tends to prevent $I_{c_2}$ from becoming much greater than $I_{c_1}$. However, because of the current-voltage characteristics of diode 14, the tendency of $I_{c_1}$ to increase to $I_{c_2}$ causes the voltage $E_{D_1}$ at the anode of the diode to increase slightly. As $E_{D_1} = E_{i_1}$ increases, the voltage at the output of amplifier 18 also increases, which in turn, causes an increase in the voltage applied on the filament thus raising the temperature of filament 16 and enabling it to release a larger number of electrons. The phenomenon being cumulative, $E_{o_1}$ becomes $E_{o_2}$ which produces a filament temperature $T_2$ at which the number of electrons leaving the filament 16 corresponds to the flow of the current $I_{c_2}$. The output voltage of the amplifier cannot increase above the value $E_{o_2}$, however, since the voltage $E_i$ is limited by $I_{c_2}$, which in turn, is limited by the intensity of the radioactive field.

Figure 2:
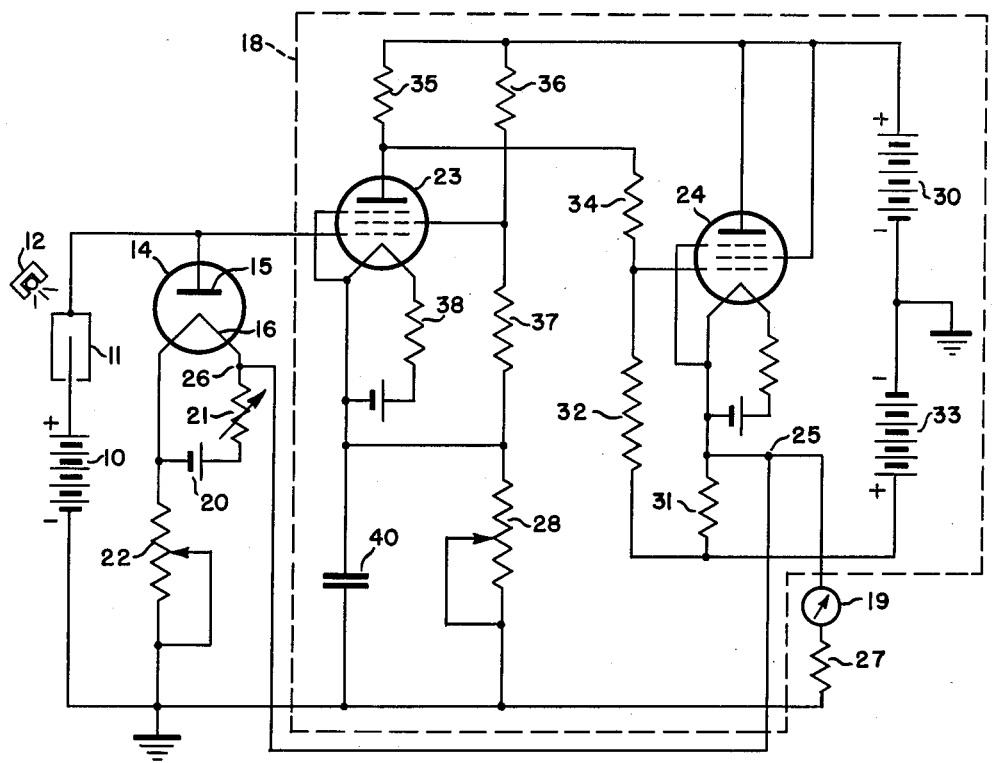
Fig. 2 is a circuit diagram which illustrates a complete circuit embodying the principles of the present invention.

Fig. 2 illustrates a practical circuit, embodying the principles described above, which may be conveniently incorporated in a portable radiation survey instrument. The circuit includes battery 10, ionization chamber 11 and diode 14 serially connected in a closed loop, as previously described. While the diode of the circuit of Fig. 1 was described as receiving all of its filament power from the feedback loop from amplifier 18, the circuit of Fig. 2 is modified to the extent that a small battery 20 is added to the filament circuit to establish a threshold heating power to the filament below which no significant thermionic emission is present. Thus the filament of diode 14 is supplied with power partly from battery 20, with variable resistor 21 provided to adjust the threshold voltage, and partly from the output of amplifier 18, the magnitude of which is adjusted by potentiometer 28.

The anode 15 of diode 14 is connected to the control grid of tube 23 which is preferably an electrometer tube which functions as a voltage amplifier. The anode of tube 23 is directly coupled to the control grid of tube 24 which is preferably a triode or a triode connected pentode, arranged as a cathode follower. Both tubes of electrometer circuit 18 are energized from voltage source 30, and a meter circuit including meter 19 and resistor 27 in series therewith is connected to the cathode of tube 24 to measure the voltage developed across resistor 31.

The cathode of tube 24 (for convenience designated point 25), is directly connected to one of the terminals of filament 16 of diode 14 (hereinafter referred to as point 26) to provide a high percentage of D. C. feedback between the output of amplifier 18 and the filament of diode 14. The D. C. feedback between points 25 and 26 serves the dual function of making the overall gain of the system independent of the drift and decay of the components of amplifier 18, and to degenerate the capacity of chamber 11, thus providing the instrument with a fast response time. This D. C. type of feedback for stabilizing purposes, can for the sake of better understanding of the principles of operation, be regarded as independent of the information feedback described in connection with Fig. 1 and on which the logarithmic response of the instrument is based. The components of the amplifier circuit are so selected that the feedback voltage from the cathode tube 24 to the filament of diode 14 is negative with respect to ground and at any time equal to a voltage developed at the anode of diode 14, which, as was previously mentioned, is positive with respect to the cathode.

For the feedback loop to function properly, it is necessary that amplifier 18 have low output impedance so that the filament of the diode does not substantially overload the amplifier. Furthermore, it is necessary for points 25 and 26 to be at the same level with respect to ground. The first requirement is met by the use of cathode follower output circuit, and the second is accomplished by the output circuit in the following manner: For normal operation of the circuit, battery 30 is of the order of 45 volts and in the linear range of operation of the amplifier, the voltage at the plate of the tube 23 varies from about 12 to 20 volts positive. If the cathode resistor of tube 24 were connected to ground, it would be impossible for point 25 to be at ground potential, for the cut-off conditions in tube 24 could never be reached. To obtain the condition that points 25 and 26 be at the same D. C. level relative to ground, grid resistor 32 and cathode resistor 31 are connected to the negative terminal of battery 33. Resistors 31 and 32 and battery 33 are so selected that when a current of $I_c = 0$ is to be measured, the voltage drop in resistor 31 may be adjusted to be equal to the potential of battery 33 by the setting of potentiometer 28. Hence, with this adjustment, there is no potential difference between point 25 and ground with the consequence that no current flows through the feedback connection through the filament 16 to ground. After this preliminary adjustment, changes in the magnitude of $I_c$, and accordingly in the magnitude of $E_i$, produce a voltage change at point 25 which is proportional to changes in $E_i$ corresponding to changes in $I_c$.

Alternatively, it is possible to adjust potentiometer 28 so as to have a predetermined bias or operating point for the system. For instance, potentiometer 28 may be adjusted so there is no current flow between points 25 and 26 when the voltage between the anode and cathode of diode 14 is of the order of a few volts. Amplifier 18 has sufficient range to operate linearly above or below this limit, thus exhibiting at point 25 a voltage varying below and above this bias voltage which is equal to the variations in voltage across diode 14 above and below the original bias thereacross. This bias is desirable because it is preferable to always maintain the voltage $E_i$ at the anode of the diode above the specific saturation voltage corresponding to the operating conditions of tube 14 within the considered range.

As was previously mentioned, the output impedance of amplifier 18 is very small compared to the impedance of the utilization loop comprising filament 16, resistor 21, battery 20 and potentiometer 22. This being so, it is possible to adjust potentiometer 22 so that a predetermined increment of the voltage $E_i$, and thus of $E_o$, corresponds to a constant increment of $I_c$. Thus the slope of the system may be adjusted by means of potentiometer 22.

The operation of the circuit of Fig. 2 is essentially the same as that described in connection with Fig. 1, and will now be briefly reviewed. Prior to use, potentiometers 24, 22 and 28 are adjusted to provide the proper slope and zero current conditions. When exposed to a radiation field of intensity $S_1$, the current $I_{c_1}$ in the ionization chamber 11 develops across diode 14 a voltage $E_{D_1}$ which is above the saturation voltage of diode 14 corresponding to its then filament temperature $T_1$. Assuming that diode 14 has a linear voltage-current characteristic above its saturation voltage (there is no such thing as a perfectly saturated diode because of Shottky effects, etc.), if the instrument is then subjected to a radioactive field of greater intensity $S_2$, the current $I_c$ tends to increase. This current must flow through diode 14, but because diode 14 is temperature limited at temperature $T_1$, it opposes this tendency of $I_{c_1}$ to increase. However, by virtue of the linear voltage-current characteristic of the diode, just described, the current through the diode increases slightly resulting in a slight increase in voltage across the diode and an increment in the current flow from the filament of the diode to ground. The change in voltage across the diode resulting from this increase in current is amplified in amplifier 18 and fed back to the filament of diode 14. As a consequence, the temperature of the filament is raised, causing additional electrons to be emitted and allowing $I_c$ to increase considerably. Due to the fact that only a very small fraction of the voltage $E_i$ appears on the filament of the diode, and because a small change in filament heating voltage produces a substantial change in diode current (given by the exponential term of Richardson's equation), the voltage across the diode changes very little when $I_c$ changes substantially. The phenomenon being cumulative, the effective dynamic resistance of diode 14 decreases with increases in $I_c$ until new equilibrium conditions are reached where the voltage developed across diode 14 produces at the filament of diode 14, through the amplifier 18, a temperature $T_2$ which causes an emission of electrons corresponding to the value of $I_{c_2}$, which, in turn, is proportional to the strength of the radiation field to which the instrument is subjected. Since the voltage $E_i$ appearing at the anode, and accordingly the voltage $E_o$ applied to the filament of diode 14, varies logarithmically with changes in $I_c$, meter 19, which measures $E_o$, yields a logarithmic indication of the strength of the radiation field.

By way of illustration, typical values of the circuit components of an instrument operable over five decades may be:

Battery 10=67.5 volts
Battery 20=1.5 volts
Battery 30=45 volts
Battery 33=45 volts
Resistor 31=15 K ohms
Resistor 32=200 megohms
Resistor 34=51 megohms
Resistor 35=100 ohms
Resistor 36=390 K ohms
Resistor 37=47 K ohms
Resistor 38=56 ohms
Condenser 40=.01 farad
Tube 14=CK5889
Tube 23=CK5886
Tube 24=CK5672

It will be apparent that tube 14 may be any diode or other type of electron tube which is convertible into a diode by suitable connections and having the characteristics of low filament current, a filament of tungsten or thoriated tungsten, and low surface leakage. Other tubes investigated and found to have suitable characteristics were the CK5785, CK5886, and CK545DX.

While a D. C. amplifier has been described for providing feedback signals to the diode filament, it is possible, and probably desirable in cases where sufficient power is available, to replace amplifier 18 with a network which develops an alternating current signal having an amplitude proportional to the D. C. level applied at its input. Such an A. C. signal would preferably have a period short compared to the time constant of the combination of the chamber capacitance and that part of amplifier 18 which is subjected only to direct current signals. The use of alternating current in the feedback loop has the advantage that signals can be efficiently stepped down in the feedback path by means of a current transformer.

Figure 3:
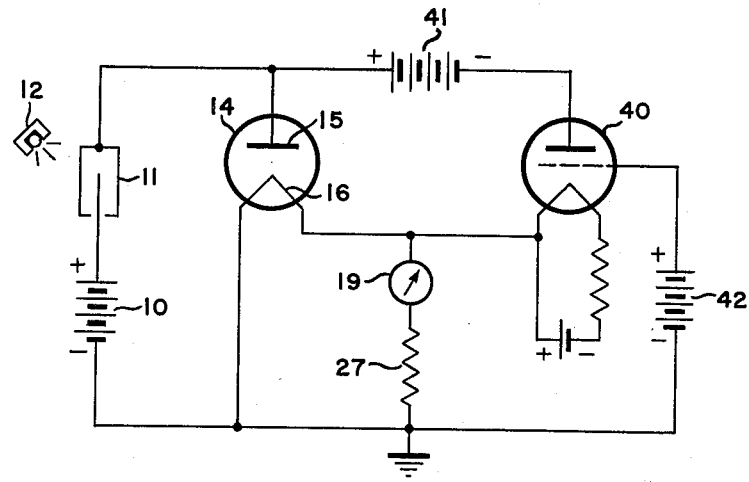
Fig. 3 is a circuit diagram illustrating a modification of a portion of the circuit of Fig. 2.
Figure 4:
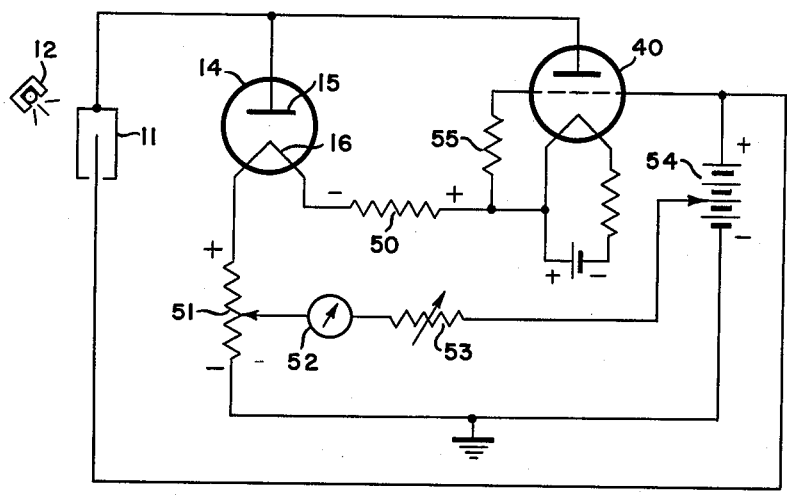
Fig. 4 is a circuit diagram illustrating a number of refinements in the circuit of Fig. 3.

While the amplifier circuit 18 has been described in Fig. 2 as including two tubes, comparable results, and an incidental reduction in the tube and battery complement of the instrument can be realized by the utilization of an inverted triode circuit, two modifications of which are shown in Figs. 3 and 4. Referring first to Fig. 3, the circuit is the same as that described above, insofar as the connection of battery 10, chamber 11 and diode 14 is concerned, but differs in that a single triode 40 provides the necessary information feedback for controlling the filament temperature of diode 14. In the inverted triode connection, the plate is operated at negative voltages with respect to the cathode; thus, the system has a high input impedance. The anode 15 of diode 14 is connected to the anode of tube 40 through battery 41 having the polarity shown, whereby the anode of tube 40 is negative with respect to the filamentary cathode, which is connected to ground through the filament 16 of diode 14. The grid of tube 40 is maintained at a fixed positive potential relative to ground by battery 42, connected as shown. With tube 40 connected and energized, the voltage at the anode of the tube influences the field between the cathode and the grid of the tube, and accordingly, since the grid is positive, controls the flow of electrons to the grid. Current flow in the tube is therefore controlled by variations in potential of the anode, as opposed to the conventional grid control, and the tube can be operated with batteries of much lower voltages for comparable current drain.

In operation, the tendency of the potential at the anode of tube 14 to increase with increased radiation intensity from source 12, causes the potential of the anode of tube 40 to be raised, making it less negative with respect to the cathode, and allowing more current to flow in the tube. This current flows through the filamentary cathode 16 of diode 14 causing an increase in the temperature thereof and an attendant increase in the emission of electrons, to such a point that the electrons emitted correspond to the current in ionization chamber 11, which in turn is controlled by the intensity of the radiation from source 12. Meter 19 indicates the voltage developed across filament 16 of diode 14 (in effect, the cathode load resistance of tube 40) by the current fed back, and because of the exponential term of Richardson's equation, fully discussed above, yields a response which varies as a logarithmic function of radiation intensity.

Fig. 4 illustrates a circuit similar to the inverted triode amplifier just described but includes a number of refinements to improve its adaptability. The ionization chamber 11 and diode 14 are connected as before, but instead of using bucking battery 41 in the high impedance portion of the circuit, which requires insulation of the battery to have a very high leakage resistance, the anode of diode 14 is directly connected to the anode of tube 40, the anode of tube 40 being rendered negative with respect to the cathode by resistor 50 connected in the feedback path. The current flow in this resistor develops a voltage thereacross having the polarity indicated and produces approximately the same effect as battery 41 in the circuit of Fig. 3.

A second refinement is the provision of potentiometer 51 in series with filament 16 of diode 14, and the connection of the movable tap thereof through meter 52 and resistor 53 to a tap on voltage source 54 to permit the zero adjustment of the instrument. In the Fig. 3 circuit, batteries 41 and 42 cause a predetermined flow of current in tube 40, even in the absence of radiation, therefore precluding adjustment of meter 19 to zero while maintaining a suitable threshold voltage across diode 14, whereas in the circuit of Fig. 4, potentiometer 51 can be adjusted to cause meter 52 to read zero in the absence of radiation, and thereafter as the current through resistor 51 increases with radiation intensity, the difference in potential between the adjusted point of potentiometer 51 and the tap on voltage supply 54 is an indication of the radiation intensity and varies logarithmically therewith.

In the circuit of Fig. 3, the total filament heating current for diode 14 flows through tube 40, a portion of which, namely, the threshold heating current, is determined by the specifications of the instrument and the characteristics of diode 14. In the Fig. 4 modification, an economy of filament current for tube 40 and accordingly, an extension of the tube life, is accomplished by deviating that portion of the total filament heating current corresponding to the threshold heating current through resistor 55 connected between the grid and cathode of tube 40. Thus, only the differential current required by the range coverage of the instrument need be supplied by the filament of tube 40.

The use of resistors 50 and 51 requires that battery 54 be of higher voltage than battery 42 of the circuit of Fig. 3, but the availability of this increased potential source is used to advantage by also energizing ionization chamber 11 from this source. Thus, while battery 54 is of higher potential than the batteries in the circuit of Fig. 3, and must supply all of the current drain in the circuit, the battery complement is reduced to a single high voltage battery.

While the circuits of Figs. 3 and 4 are somewhat simpler than the amplifier 18 of Fig. 2, they have the shortcoming of being unable to supply D. C. voltage feedback and accordingly, the instrument has a rather long time constant. That is, as the incident radiation changes from one level to another, it takes considerable time for the voltage on ionization chamber 11 to readjust itself, this time being a function of the product of the capacitance of the chamber 11, including associated stray capacity, and the resistance of diode 14. For usual survey purposes, this sluggishness may not be objectionable, but if rapid fluctuations of intensity level are to be determined, the instruments of Figs. 3 and 4 may be unable to indicate them.

From the foregoing description it is seen that there is provided a radiation measuring instrument which yields an indication which varies as a logarithmic function of incident radiation, and which is relatively insensitive to changes in battery voltage and is accurate over wide ranges. While a diode is employed as the logarithmatizing element, it will be seen that the mode of operation is much different from, and has certain inherent advantages over, the so-called logarithmic diode circuit. In the present circuit, battery 10 is connected so as to produce a flow of current $I_c$ in such a direction that a positive voltage with respect to the filament appears on the anode of the tube whereas in the logarithmic diode circuit the operating voltage developed across the diode is negative with respect to the cathode. In the logarithmic diode circuit the filament of the diode is heated to a fixed temperature, but because the anode is negative, all of the emitted electrons are not collected, resulting in a retarding field being built up around the filament. In the present circuit, however, the filament is heated to an exceptionally low temperature, in fact, to such a low temperature that the number of the electrons emitted by the filament corresponds to the very small currents being measured. The voltage of the anode is such that all the emitted electrons are collected; consequently, no retarding field effects are present. To achieve this result, the filament is heated to a temperature far below the rated filament temperature of the tube, thus greatly extending the useful life of the tube. In the logarithmic diode arrangement with a fixed heater voltage, the diode exhibits a logarithmic current-voltage response, but as the voltage of the heater changes slightly, the slope and operating position of the system change and cannot independently be adjusted to correct for battery drift. In the present instrument, however, the system is logarithmic by virtue of the exponential term of Richardson's equation characterizing the emission from the filament. In effect, an image of the positive voltage developed across the diode is fed back through an exterior circuit to the filament leads of the diode. The current in the diode can therefore be interpreted in the external circuit and can be conveniently adjusted and controlled exteriorly of the tube. Changes in heater voltage resulting from battery drain are therefore immaterial since the temperature of the filament is purposefully varied in response to changes in current to be measured to obtain the logarithmic characteristic. Although the geometry of the electrodes of the diode enters into Richardson's equation to a slight extent, it can be neglected when the tube is operated in the manner herein described, thus permitting a large selection of tubes which are suitable for use in the circuit. With the logarithmic diode circuit on the other hand, the logarithmic response requires that the electrodes of the diode be substantially planar, thus limiting the number of tubes which may be used as the logarithmatizing element.

While there are herein disclosed preferred embodiments of the invention, it will be understood that modifications and changes in the same may occur to persons skilled in the art within the spirit and scope of the appended claims.

What is claimed is:

1. A radiation measuring instrument yielding an indication varying as a logarithmic function of incident radiation comprising, a source of potential having positive and negative terminals, an ionization chamber adapted to operate in the saturated region when energized by said source, and a diode-connected electron tube having an anode and a filamentary cathode connected in a closed loop in the order named, the negative terminal of said potential source being connected to one terminal of the filamentary cathode of said tube whereby the anode of said tube is positive with respect to the filamentary cathode, an amplifier circuit having high input impedance and low output impedance connected to amplify the voltage developed across said tube, a feedback connection from the output of said amplifier to the other terminal of the filament of said tube for coupling the entire output of said amplifier to the filament of said tube to control the temperature of said filament, said amplifier having a gain such as to supply filament heating power of a magnitude to cause the number of electrons emitted by said filamentary cathode at all times to correspond to the current in said ionization chamber, and means for indicating the magnitude of the power fed back to said filament.

2. A radiation measuring instrument yielding an indication varying as a logarithmic function of incident radiation comprising, a source of potential having positive and negative terminals, an ionization chamber adapted to operate in the saturated region when energized by said source, and a diode-connected electron tube having an anode and a filamentary cathode connected in a closed loop in the order named, the negative terminal of said potential source being connected to one terminal of the filament of said tube whereby the potential of the anode of said tube is positive with respect to the filamentary cathode, a two-tube electrometer circuit having high input impedance and a cathode-follower output circuit connected to amplify the voltage developed across said tube, a feedback connection from said cathode follower circuit to the other terminal of the filament of said tube for providing stabilization of said electrometer circuit and supplying heating power to the filament of said diode-connected tube, said amplifier having a gain such that it supplies heating power to said filament of such a magnitude that the electrons emitted by said filament at all times corresponds to the current in said ionization chamber, and a meter for indicating the magnitude of the power fed back to said filament.

3. Apparatus in accordance with claim 2 and an auxiliary source of filament heating power connected to the terminals of the filamentary cathode of said diode-connected tube for establishing a predetermined bias voltage across said tube.

4. A radiation measuring instrument yielding an indication varying as a logarithmic function of incident radiation comprising, a source of potential having positive and negative terminals, an ionization chamber adapted when energized by said source to operate in the saturated region to produce a current linearly proportional to incident radiation, and a diode having an anode and a filamentary cathode serially connected in the order named, the negative terminal of said potential source being connected to one terminal of the filamentary cathode of said diode whereby the current in said ionization chamber resulting from incident radiation flows through said diode and the potential of the anode thereof is positive with respect to said filamentary cathode, an amplifier having high input impedance and low output impedance and linear characteristics over a predetermined range connected to amplify the voltage developed across said diode, a feedback connection between the output of said amplifier and the other terminal of the filamentary cathode of said diode for providing voltage stabilization to said amplifier and supplying filament heating current to the filmentary cathode of said diode, said amplifier having a gain such that the current supplied to the filament of said diode produces an emission of electrons corresponding at all times to the current in said ionization chamber, and a meter for indicating the magnitude of the current supplied to the filamentary cathode of said diode.

5. A radiation measuring instrument comprising, in combination, a radiation detector adapted to produce an output current which varies linearly with the intensity of incident radiation, an amplifier having input and output circuits, means connecting said radiation detector to the input circuit of said amplifier, a discharge device having at least an anode and a cathode connected in shunt across said input circuit, and means connected between the output circuit of said amplifier and said discharge device for controlling the electron emissivity of the cathode thereof, the gain of said amplifier being such that the electrons emitted from said cathode correspond to the current from said detector over a range of temperatures where emissivity is logarithmically proportional to cathode temperature.

6. A radiation measuring instrument comprising, in combination, a radiation detector for producing an output current which varies linearly with the intensity of incident radiation, an amplifier circuit having a high impedance input circuit and a low impedance output circuit, means connecting said radiation detector to the input circuit of said amplifier, a space discharge device having at least an anode and a filamentary cathode connected in shunt across said input circuit and arranged to operate with a positive voltage at its anode, and means connected between the output circuit of said amplifier and said discharge device for controlling the electron emissivity of said filamentary cathode, the gain of said amplifier being such that the number of electrons emitted from said filamentary cathode corresponds at all times to the output current of said detector over a range of temperatures where emissivity is logarithmically proportional to filament temperature.

7. A radiation measuring instrument comprising, in combination, a detector sensitive to radiation to yield a current linearly proportional to the intensity of incident radiation, a variable impedance path connected in series with said detector, said path including a discharge device having at least an anode and a cathode, means for amplifying the voltage developed across said variable impedance path, and means connected between the output of said amplifying means and said discharge device for coupling the entire output of said amplifying means as heating power for the cathode thereof, said amplifying means having a gain such that the electrons emitted from said cathode correspond to the current from said detector over a range of temperatures where emissivity is substantially logarithmically proportional to cathode temperature.

8. A radiation measuring instrument yielding an indication which varies as a logarithmic function of incident radiation comprising, in combination, a detector sensitive to radiation to yield a current linearly proportional to the intensity of incident radiation, a variable impedance path connected in series with said detector whereby all the current from said detector flows in said path, said variable impedance path including a discharge device having at least an anode and a filamentary cathode, means for amplifying the voltage developed across said variable impedance path, and means connected between the output of said amplifying means and said filamentary cathode for coupling the entire output of said amplifying means to said filamentary cathode, to heat the same, the gain of said amplifying means being such that the heating power supplied produces emission of electrons from said filamentary cathode at all times equal to the current from said detector over a range of temperatures where emissivity is substantially logarithmically proportional to filament temperature.

9. A radiation measuring instrument yielding an indication which varies as a logarithmic function of incident radiation comprising, in combination, a detector sensitive to radiation yielding a current linearly proportional to the intensity of incident radiation, a diode-connected electron tube having at least an anode and a filamentary cathode in circuit with said detector to carry said detector current whereby a voltage proportional to said current is developed across said tube, an amplifier having a high impedance input circuit and a low impedance output circuit, means connecting said tube across the input circuit of said amplifier whereby a voltage appears at the output circuit of said amplifier which varies with the voltage developed across said tube, and means coupling the filamentary cathode of said tube to the amplifier output circuit whereby said cathode is heated in response to changes in detector current, the gain of said amplifier being such that the number of electrons emitted from said filamentary cathode corresponds to the detector current over a range of temperatures where emissivity is substantially logarithmically proportional to cathode temperature.

10. A radiation measuring instrument comprising, in combination, an ionization chamber, a source of energizing potential for said chamber to provide saturated operation whereby said chamber yields an output current which varies substantially linearly with the intensity of incident radiation, a diode-connected electron tube having at least an anode and a filamentary cathode connected in series with said ionization chamber and said source of potential, an amplifier including an electron tube having at least a control grid and having an input and an output circuit, means connecting said diode-connected tube in shunt across the input circuit of said amplifier tube with the anode of said diode-connected tube connected to the control grid of said amplifier tube, and means connected between the output circuit of said amplifier and the cathode of said diode-connected tube for controlling the electron emissivity of said filamentary cathode, means for setting the gain of said amplifier so that the output of said amplifier causes emission from said cathode corresponding to the current from said ionization chamber over a range of filament temperatures where emissivity is substantially logarithmically proportional to temperature.

11. A radiation measuring instrument comprising, in combination, an ionization chamber, a source of potential for said chamber to provide saturated operation thereof whereby said chamber yields an output current linearly proportional to the intensity of incident radiation, a diode-connected electron tube having an anode and a filamentary cathode, means connecting said diode-connected tube in series with said potential source and said chamber, an amplifier circuit including first and second tubes each having at least a control grid and a cathode, said second tube being resistance-coupled to the first tube and connected as a cathode follower, means connecting the anode of said diode-connected tube to the control grid of said first tube, a connection between the cathode of said second tube and the filamentary cathode of said diode-connected tube for supplying heating current to said filamentary cathode in response to changes in voltage at the cathode of said second tube, means for setting the gain of said amplifier such that the heating current supplied to said filamentary cathode is of a value to cause emission of electrons at all times equal to the output current of said ionization chamber over a range of temperatures where emissivity is substantially logarithmically proportional to temperature, and means for measuring said heating current.

12. A radiation measuring instrument yielding an indication varying as a logarithmic function of incident radiation comprising, in combination, a source of direct potential having positive and negative terminals, an ionization chamber having an outer electrode and a center electrode, a space discharge device having at least an anode and a filamentary cathode, means connecting the positive terminal of said source of potential to the inner electrode of said ionization chamber, means connecting the negative terminal of said source of potential to one terminal of the filamentary cathode of said discharge device, means connecting the outer electrode of said ionization chamber to the anode of said discharge device, an amplifier including an electron tube having at least a control grid and provided with an input circuit and a low impedance output circuit, means connecting the anode of said discharge device to the grid of said amplifier tube, a connection between the output circuit of said amplifier and the filamentary cathode of said discharge device for controlling the electron emissivity of said cathode in accordance with the output of said amplifier, the gain of said amplifier circuit being such that the output of said amplifier causes emission of electrons from said filamentary cathode corresponding at all times to the current produced in said ionization chamber by incident radiation over a range of filament temperatures where emissivity is substantially logarithmically proportional to filament temperature.

References Cited in the file of this patent

UNITED STATES PATENTS

| | | |
|---|---|---|
| 1,990,055 | Timmer | Feb. 5, 1935 |
| 2,063,304 | Farrow, Jr. | Dec. 8, 1936 |
| 2,615,063 | Brown | Oct. 21, 1952 |
| 2,637,820 | McCreary | May 5, 1953 |